Dec. 19, 1933.     E. T. HAGIST     1,939,813
SOLDERLESS WIRE CONNECTER OR CLAMP
Filed May 19, 1930
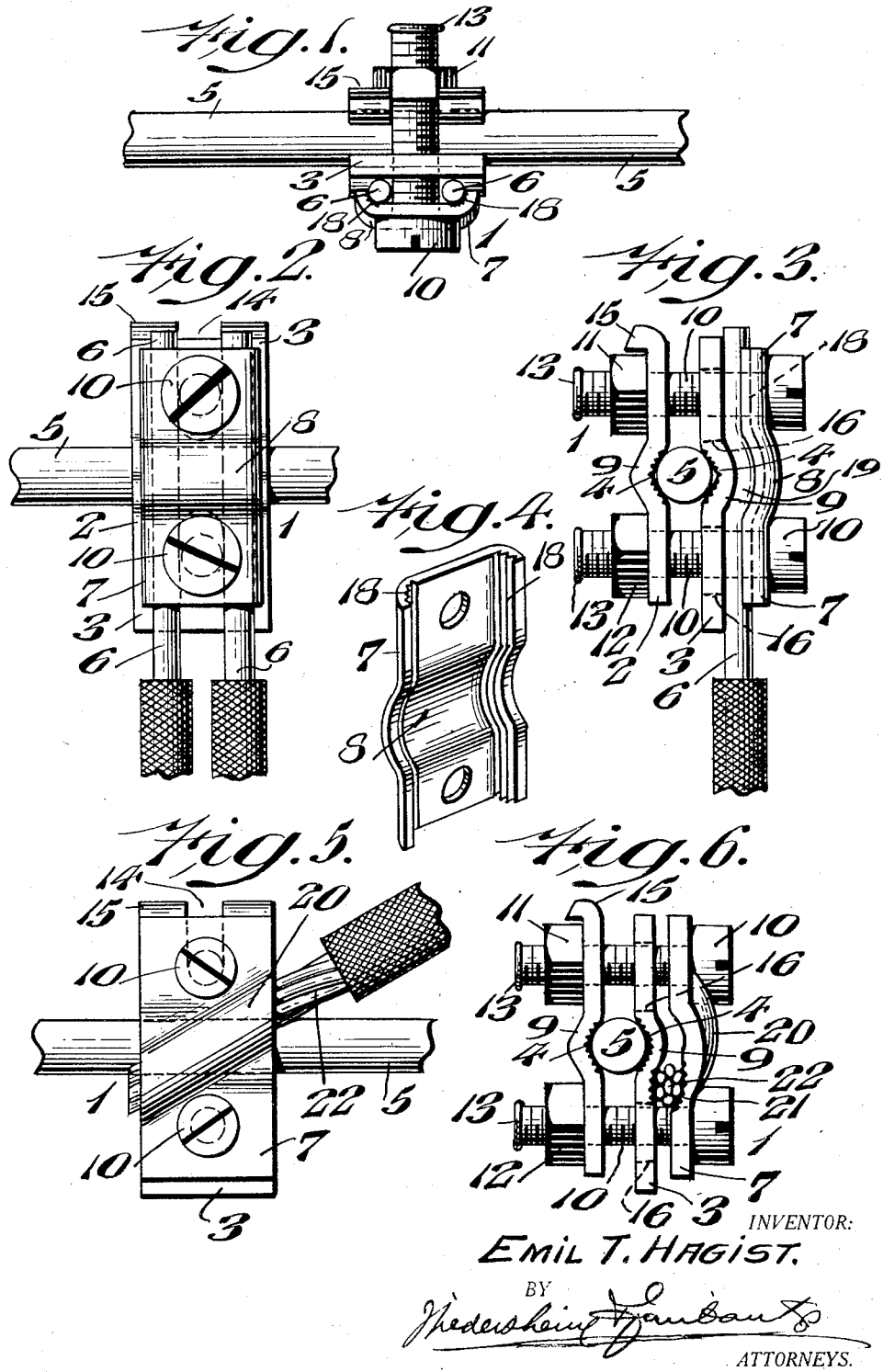
INVENTOR:
EMIL T. HAGIST.
BY
ATTORNEYS.

Patented Dec. 19, 1933

1,939,813

UNITED STATES PATENT OFFICE 1,939,813

SOLDERLESS WIRE CONNECTER OR CLAMP

Emil T. Hagist, Glenside, Pa.

Application May 19, 1930. Serial No. 453,688

2 Claims. (Cl. 173—263)

My invention relates to a new and useful wire connecter or clamp for the purpose of connecting or joining wires together and more particularly for the purpose of connecting electrical current conducting wires.

My invention further relates to a wire connecter or clamp which is adapted to clamp or connect rigidly and permanently one or more auxiliary or tap wires to a main wire without the use of solder, my device consisting of simple metal stampings of a novel contour and bolts so arranged that the connecter or clamp will resist maximum torsional and tensile strain, and whereby a connecter possessing maximum electrical conductivity is produced for use in making out-door tap connections of the usual variety made on electric light and power distribution systems.

My invention further relates to a clamp or connecter of this general character which is so arranged and assembled that it may be applied to a plurality of wires without disconnecting any of the parts and so that none of the parts can be removed accidentally or unintentionally regardless of the extent or degree of strain to which the assembly is subjected, which renders my device particularly well adapted for making connections from aerial positions such as from electric pole lines and aerial brackets attached to buildings for supporting the electric service lines.

My novel connecter is further intended for use in making transformer primary and secondary taps on pole lines and for attaching wires extending from the building service conduit to the electric power main wires attached to the building bracket.

My invention still further relates to a novel connecter which in addition to affording the strength, security, and rigidity of a soldered connection or splice can also be readily and easily attached from hazardous positions such as from the top of poles and ladders without difficulty or danger, and whereby a workman is relieved of the necessity of bending, forming or changing the contour of the wire in the making of a splice or connection.

My invention further relates to a connecter so arranged as to clamp the wires from which the insulation has been removed for a sufficient length to make metallic contact between several wires, and which is further so arranged that while the tap wires are inserted into the connecter as straight wire ends they will be formed or deflected and then locked and rigidly clamped over the entire length of the bare portion, by the mere application and assembly or tightening of my novel device.

My invention still further relates to a novel clamp or connecter which is adapted to clamp or connect one or more tap wires transversely to a main wire in such a manner as to present the least electrical resistance between said main and tap wires, thereby reducing the voltage drop to a negligible minimum factor.

My invention still further relates to a novel connecter which is of a highly compact construction so that a neat joint is formed, my novel connecter being further adapted for use in conjunction with wires of various sizes which may be used in extending electrical service from a main line to a building.

To the above ends, my invention consists of two plates or jaws adapted to clamp a main electric service wire and an auxiliary plate or jaw of a novel contour adapted to coact with the outer surface of one of said inner jaws to clamp therebetween one or more tapping wires and bolts or their equivalent engaging the said plates or jaws for tensioning the same in clamped position upon said wires.

My invention still further consists of means on the inner surfaces of said jaws for effecting positive engagement with the wires clamped therebetween, said jaws being further formed or deflected to bend or deflect said wires into an interlocking position.

My invention further consists of a connecter the clamping jaws of which are so constructed as to permit the application and removal of the connecter to main and tapping wires without disconnecting the main wire.

My invention still further consists of various other novel features of construction and advantage, all as hereinafter described and claimed.

In the accompanying drawing:

Fig. 1 is a plan view of my novel connecter shown applied for connecting two tap wires to a main service wire;

Fig. 2 is a view in side elevation of Fig. 1;

Fig. 3 is an end elevation of Fig. 2;

Fig. 4 is a perspective view of the clamping plate or jaw which clamps the auxiliary or tap wires;

Fig. 5 is a view similar to Fig. 2 showing a modified form of my invention; and

Fig. 6 is a left hand end elevation of Fig. 5.

For the purpose of illustrating my invention I have shown in the accompanying drawing forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawing, in which similar numerals of reference indicate corresponding parts, and more particularly to Figs. 1 and 3, 1 designates my novel connecter or clamp which comprises the inner jaws 2 and 3 which are provided with the inner serrations 4, which are adapted to receive and engage the main electrical conductor 5. 6 designates a pair of tap wires which are to be electrically connected to the main wire 5 to supply current to any desired point, not shown. 7 designates an outer clamping jaw or plate for clamping the tapping wires 6 in the manner shown in Fig. 3, said plate or jaw 7 being provided with the humped or internally concaved portion 8, whose contour corresponds to the humped or externally convexed portions 9 of the inner plates or jaws 2 and 3. 10 designates screws which pass through suitable apertures in the plates 2, 3, and 7 and which carry the nuts 11 and 12, the ends of said screws being upset as at 13 to prevent the disengagement or falling off of said nuts. The plate or jaw 2 is opened or slotted at one end thereof as at 14 and is provided with the deflected portions or terminal lugs 15 which serve to engage the nut 11 to prevent rotation thereof, when the coacting screw 10 is being turned or tightened. The other nut 12 is prevented from rotation during the turning of the corresponding screw by means of the humped portion 9 of the plate 2. The plate 3 is provided with the upper and lower adjustment slots 16 so that it may be raised and lowered upon the screws 10 for a purpose hereinafter set forth. The plate 7 is provided with the serrated edges 18 for engaging the tap wires 6.

In assembling my novel connecter the plates 2, 3, and 7 are placed in position as shown in Fig. 3, and the screws or bolts 10 are then inserted through suitable apertures therein. The nuts 11 and 12 are then screwed on to the screws 10 and the ends of the screws are upset or enlarged as at 13 to prevent disengagement of the nuts in subsequent manipulation of the connecter, thereby eliminating the loss of nuts due to dropping to the ground from the top of a pole or other elevated point. The device is now ready for use in the following manner: The upper screw 10 is lifted through the opening 14 of the plate 2 and the entire assembled connecter is then slipped over the fixed main wire 5 so that said wire is engaged by the serrated grooves 4 of the plates 2 and 3. The tap wires 6, with the insulation removed, are then inserted between the plates 3 and 7, and the screws 10 are next tightened. The nuts 11 and 12 are prevented from rotation by the lugs 15 of the upper end of the plate 2 and by the hump 9 in the central portion thereof respectively, thereby eliminating the necessity of holding the nuts 11 and 12 during the turning of the screws 10. The tightening of the screws 10 to clamp the jaws or plates 2, 3, and 7 together upon the main wire 5, and the tap wires 6 respectively, results in deflecting the initially straight tap wires 6, as at 19, to conform to the humped portions 8 and 9 of the plates 7 and 3 respectively, thereby locking the tap wires 6 in position to prevent rotation thereof and to prevent the slipping out of said tap wires, regardless of the torsional or tensile strain to which said wires may be subjected. The tap wires 6 are further prevented from rotation and slipping by the serrated edges 18 of the clamping plate 7. When it is desired to disconnect my novel clamping device it is merely necessary to loosen the screws 10 until the nut 11 clears the lugs 15, whereupon the upper screw 10 is lifted through the slot 14 in the plate 2. The entire assembly is then moved downwardly until the wire 5 clears the upper edges of the plates 2, 3, and 7, thereby entirely disconnecting my device from the main wire 5 without dismantling or disconnecting the latter. To permit of the play or tilting necessary for lifting the upper screw 10 through the slot 14 of the plate 2 I provide the inner plate 3 with the elongated slots or apertures 16 so that it may be raised together with the upper screw 10 until the latter clears the upper lugs 15 of the plate 2.

In Fig. 5 I have shown a slightly modified form of my invention wherein the outer plate 7 (shown in Fig. 4) is provided with a transversely and angularly disposed humped portion 20, corresponding to the humped portion 9, which has the serrated edge 21, whereby the tap wire 22 is secured at an acute angle to the main wire 5, and is deflected or bent to conform to the angular contour of the humped portions 9 and 20 by the tightening of the fastening screws. Except for this modification the structure shown in Fig. 5 is identical with that shown in Figs. 1 to 3 inclusive.

It will thus be seen that I have devised a novel clamp which affords a stronger connection than that obtained by soldering and one which at the same time is easily and quickly detachable, so that the requirements of strength, durability, low initial cost, ease of manipulation, and highly efficient contact are attained in a high degree and by means of a very simple construction. The tendency of the heavy wires to work loose due to fatigue of the parts under constant strain is overcome since the main wire 5 and the tap wires 6 are positioned intermediate the fastening screws 10 and are thus subjected to maximum clamping action of the plates 2, 3, and 7. In actual practical experiments with my novel connecter, the tap wires 6 snapped and broke before rotating or working loose. Furthermore, due to the ample surface contact afforded, maximum current transmission is obtained.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I claim as new, and desire to secure by Letters Patent, is:

1. A permanently preassembled wire connecter comprising an upper plate having longitudinal wire receiving grooves and a deflection disposed at an angle to said grooves, there being bolt holes near the ends of said plate, an intermediate plate having a deflection therein adapted to coact with the deflection in said upper plate and having elongated bolt holes near the ends thereof, a bottom plate having a deflection therein adapted to coact with the deflection in said intermediate plate, a bolt hole near one end of said bottom plate and a bolt receiving opening in the other end of said bottom plate, and bolts adapted to pass through said bolt holes and said opening to clamp said plates upon wires therebetween, the opening in the end of said bottom plate coacting with the elongated bolt holes in the intermediate plate to permit the application of the connecter to the wires to be clamped at points intermediate the ends thereof without disassembling the connecter.

2. A permanently preassembled wire connecter comprising an upper plate having longitudinal wire receiving grooves and a deflection disposed at an angle to said grooves, there being bolt holes near the ends of said plate, an intermediate plate having a deflection therein adapted to coact with the deflection in said upper plate and having elongated bolt holes near the ends thereof, a bottom plate having a deflection therein adapted to coact with the deflection in said intermediate plate, a bolt hole near one end of said bottom plate and a bolt receiving opening in the other end of said bottom plate, bolts adapted to pass through said bolt holes and said opening to clamp said plates upon wires therebetween, the opening in the end of said bottom plate coacting with the elongated bolt holes in the intermediate plate to permit the application of the connecter to the wires to be clamped at points intermediate the ends thereof without disassembling the connecter, nuts for engaging said bolts, means on the underside of said bottom plate adapted to engage said nuts to prevent rotation thereof during the turning of said bolts, and means on said bolts for preventing total disengagement of said bolts from said nuts.

EMIL T. HAGIST.